United States Patent [19]
Ohmura

[11] Patent Number: 4,516,843
[45] Date of Patent: May 14, 1985

[54] CAMERA

[75] Inventor: Hiroshi Ohmura, Tokyo, Japan

[73] Assignee: Fuji Photo Film Co., Ltd., Kanagawa, Japan

[21] Appl. No.: 615,768

[22] Filed: May 31, 1984

[30] Foreign Application Priority Data

Jun. 6, 1983 [JP] Japan ................... 58-99535

[51] Int. Cl.³ .................... G03B 1/18; G03B 17/02
[52] U.S. Cl. .................. 354/173.1; 354/212; 354/214; 354/288
[58] Field of Search .............. 354/171, 173.1, 173.11, 354/212, 214, 288

[56] References Cited
U.S. PATENT DOCUMENTS

| | | | |
|---|---|---|---|
| 3,481,260 | 12/1969 | Ettischer et al. | 354/212 |
| 4,279,486 | 7/1981 | Ogawa | 354/212 X |
| 4,331,407 | 5/1982 | Winkler et al. | 354/212 X |
| 4,469,421 | 9/1984 | Kamata | 354/212 |

*Primary Examiner*—William B. Perkey
*Attorney, Agent, or Firm*—Young & Thompson

[57] ABSTRACT

A camera comprising two parts, i.e., a main camera body and a movable body portion, one of which includes a film supply chamber and the other includes a film take-up chamber. The movable body portion is capable of extensibly moving to its film loading position so as to get a lengthened film passage way extending between the film supply and film take-up chambers. A container with a previously drawn film leader is inserted axially into the film supply chamber with the threading of the film leader into the film passage way. Closing a film loading door causes automatically the movable body portion to move toward and incorporate with the main camera body as a complete camera body. In the complete camera body, the film loading door is restricted to open and a motor for film advancement is actuated.

13 Claims, 10 Drawing Figures

CAMERA

BACKGROUND OF THE INVENTION

The present invention relates to photographic cameras, and more particularly to a "drop-in loading" camera in which a film container such as a film cassette or a film magazine is inserted axially into a film supply chamber of the camera.

One of easy loading cameras placed on the market is a drop-in loading camera. In the drop-in loading camera, a bottom door is opened for opening a film supply chamber and a film entrance slot at the bottom of the camera so as to allow a film container to be inserted axially into the bottom opening to the film supply chamber with threading a film leader previously drawn out of the container into a film passage way. In general, the length of film leader previously drawn out of the container depends on the manufactures or film types. Some film containers have a drawn film leader longer than the distance between the film supply chamber and a film take-up chamber of the camera. The forward end of the long drawn leader, which is liable to be caught in the entrance slot, disables the container to be dropped into the film supply chamber for loading. Even if a proper length of film leader is drawn out of the container, there is appeared the same problem in the case of either cameras in which the distance between the film supply and film take-up chambers is shortened for miniaturization or half-size cameras.

For avoiding the problem in such drop-in film loading procedure, it is required for operators to rewind the drawn film leader into the container by manually rotating the spool of the container, leaving just enough film leader to reach the film take-up chamber, before film loading. However, such film loading procedure including the rewinding operation is troublesome and contrary to the aim of easy loading.

OBJECT OF THE INVENTION

It is therefore a primary object of the present invention to provide a camera which allows to take a drop-in loading without rewinding a long film leader drawn out of a film container.

It is another object of the present invention to provide a camera which is easy to miniaturize.

It is additional object of the present invention to provide a camera which has the provision of a movable body portion capable of moving for advancing a drawn film leader out of a film container loaded to a film take-up chamber.

It is a further object of the present invention to provide a camera which has an improved body construction including a mavable body portion capable of automatically moving to complete the camera body in response to the movement of film loading door for closing and shielding a film supply chamber and film passage way.

It is still further object of the present invention to provide a camera which has an improved door construction adapted to restrict opening movement of a film loading door, unless a movable body portion is extensibly moved for film loading and unloading.

It is a final object of the present invention to provide a camera which has an improved body construction including a movable body portion adapted to permit power supply to a motor for film advancement upon return movement of the movable body portion.

SUMMARY OF THE INVENTION

According to the present invention, there is provided a drop-in loading camera of the type having two body members, one of which is mounted on and extensibly movable relative to the other. The camera is provided with a film supply chamber in one of these two body members and a film take-up chamber in the other. The movable body member, which is extensibly movable relative to the other so as to increase the distance between the film supply and film take-up chambers when loading a film container, allows film containers with different lengths of film leaders drawn out thereof to be drop-in loaded without rewinding the drawn leaders. Such camera body construction contributes much to designing half-size cameras and miniaturized cameras.

In preferred embodiments of the present invention, a movable body member or body portion is extensibly moved to a position for film loading and then locked there. After film loading, the movable body portion is unlocked in cooperation with closing a film loading door and returns to an incorporated position where a whole camera body is completed. With the return movement of the movable body portion, a sprocket is forced to rotate so as to advance the drawn film leader toward a film take-up chamber. The movable body portion returned to the incorporated position keeps the film loading door latched so as not to open the camera and as well as a switch for a motor turned on.

BRIEF DESCRIPTION OF THE DRAWINGS

The exact nature of the present invention, as well as other objects and advantages thereof, will be readily apparent from consideration of the following specification relating to the accompanying drawings, in which like reference characters designate the same or sililar parts throughout the figures thereof and wherein.

DETAILED DESCRIPTION OF THE INVENTION

Description will hereunder be given of the preferred embodiments of a camera according to the present invention with reference to the accompanying drawings.

Figure 1:
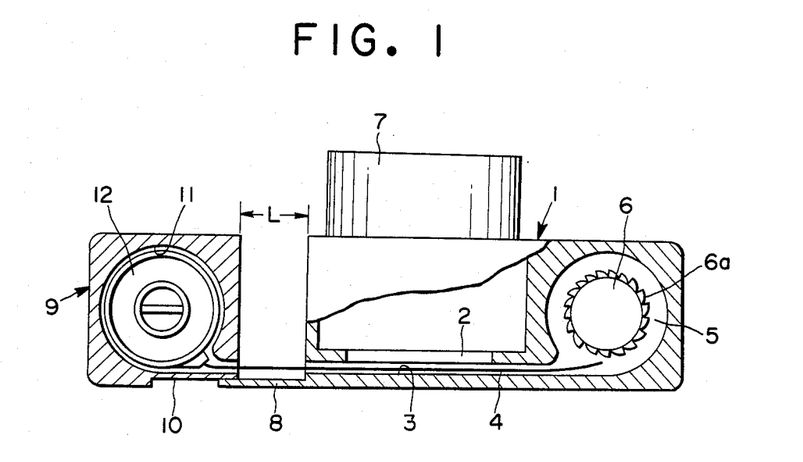
FIG. 1 a cross sectional view of an embodiment of a camera with a movable body portion including a film supply chamber therein, which is shown in a position loading.
Figure 2:
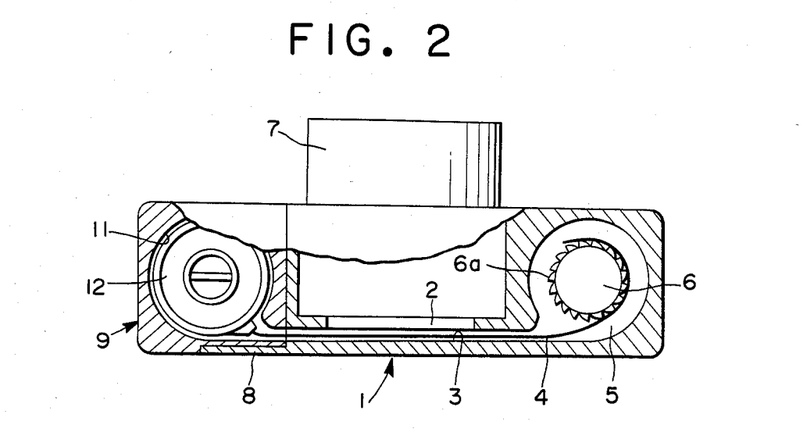
FIG. 2 is a cross sectional view of the camera shown in FIG. 1, which is shown in an incorporated position where the camera is completed for taking pictures.

Referring first to FIGS. 1 and 2, a camera according to the present invention comprises a main camera body 1 having an objective lens 7 attached to the front thereof and a movable member or movable body portion 9, forming part of a complete body, expansibly mounted on the main camera body 1. The camera body 1 has an exposure aperture 2 which in turn allows to expose a film 4 positioned in a film passage way 3 defined behind the exposure aperture. Adjacent the film passage way 3 there is provided a film take-up chamber 5, which includes a film take-up spool 6 rotatably mounted therein. The take-up spool 6, as is well known in the art, has a plurality of film hooking teeth 6a which in turn are engageable with perforations 4a of film for capturing the film 4. On the side of the main camera body opposite to the film supply chamber 5 there is provided a guide support 8 which in turn slidably fits into a recessed portion 10 for extensible movement of the movable body portion 9. The movable body portion 9, on the other hand, includes therein a film supply chamber 11 into which a film container 12 is inserted axially.

In a film loading procedure, the movable body portion 9 is extensibly moved to the left in FIG. 1, substantially increasing the length of the film passage way 3 by "L". Then, the film container 12 is dropped endwise, i.e., axially into the film supply chamber 11. At this time, the extended camera body allows insertion of the film leader previously drawn out of the film container 12 into the film passage way 3 without the forward end of the leader caught or impeded by the end wall of the film passage way 3.

After the insertion of the film container 12 into the film supply chamber 11 the movable body portion 9 is moved to the right and is incorporated with the main camera body as shown in FIG. 2, completing a whole camera body. Upon effecting a film winding operation, the rotation imparted to the film take-up spool 6 by, for example, an automatic film transport or advancing mechanism, enables one or some of a plurality of film hooking teeth 6a of the take-up spool 6 to positively engage the perforation or perforations 4a of the film leader so as to capture the film leader in a manner well known in the art, completing an automatic film loading.

Figure 3:
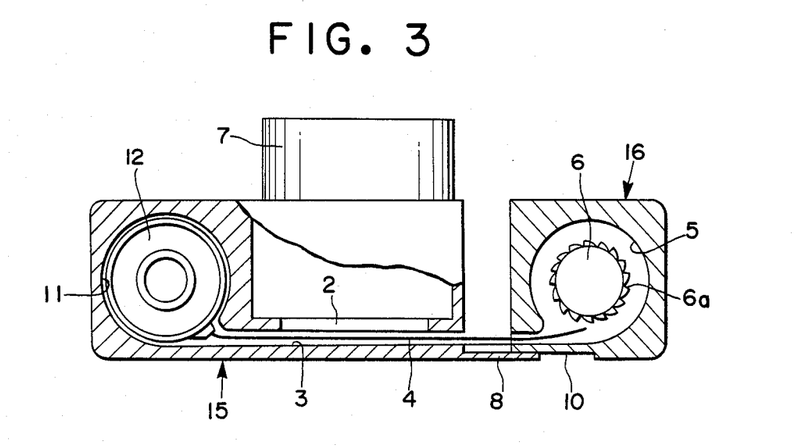
FIG. 3 is a cross sectional view of another embodiment of a camera, which has a film take-up chamber in a movable body portion, illustrating the camera in a position where the movable body portion may assume after the camera has been loaded but before the loading door has been closed.

FIG. 3 shows another embodiment of the camera according to present invention in which a body portion which is adapted to extensibly move includes a film take-up chamber. In this embodiment, the main camera body 15 includes a film supply chamber and the movable camera body 16 has the film take-up chamber 5 therein.

Figure 4:
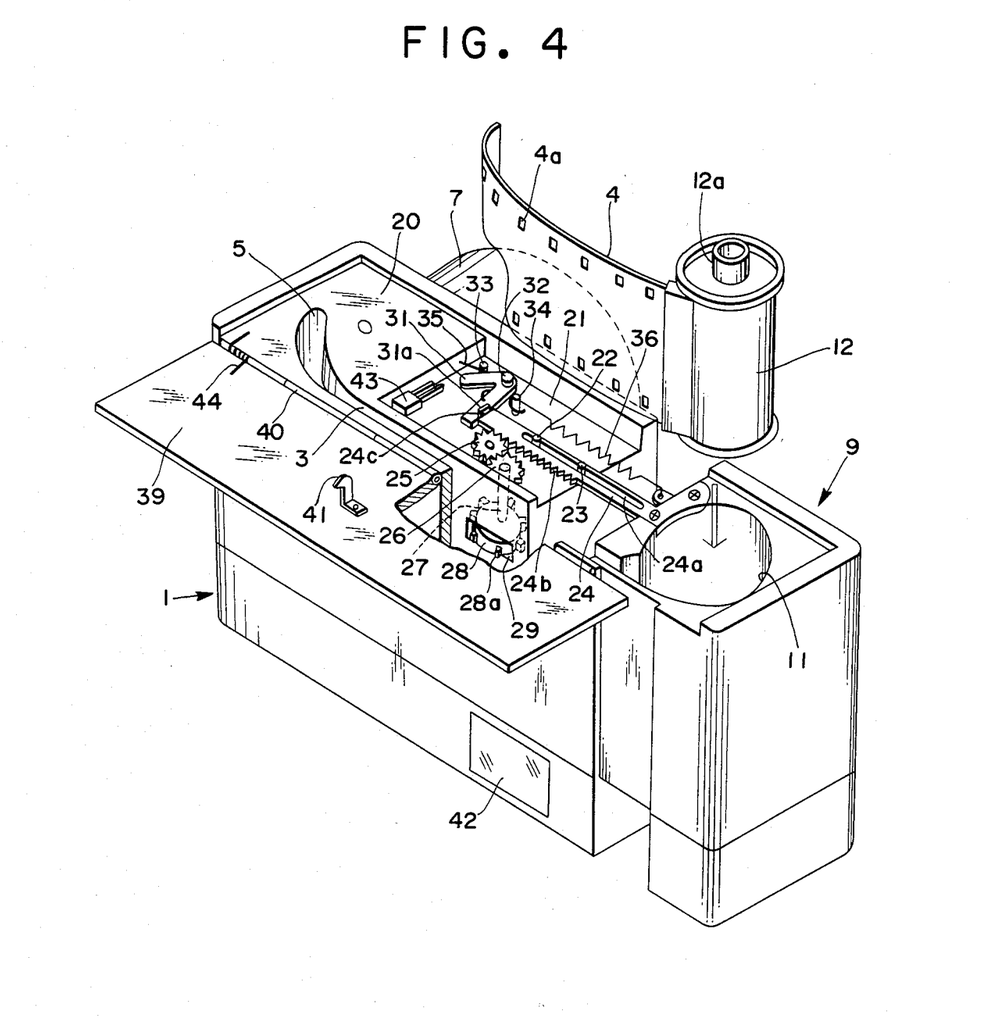
FIG. 4 is a bottom perspective view of the camera, shown in FIG. 1, opened to show a mechanism for cooperating the movable body portion with the film loading door.

FIG. 4 shows the camera of FIG. 1 upside down, opened to explain a cooperating mechanism between the movable body portion and a film loading door. The camera body 1 is provided with a base plate 20 which is formed with a recessed portion 21 having guide pins 22 and 23 mounted thereon for guiding a slide lever 24 with a rack 24b formed along its one side. One end of the slide lever 24 is fixedly attached to the movable body portion 9.

The sliding lever 24 is coupled, via a pinion 25, an gear wheel 26 and a shaft 27, to sprocket drum 28 having a plurality of teeth 28a provided therearound. The rotation imparted to the sprocket drum 28 by the sliding lever 24 enables one or two of the teeth 28a protruding into the film passage way 3 through an aperture 29 to engage into the perforation or perforations 4a of the film leader so as to advance the film 4 toward the film take-up chamber 5. It should be noted that there is provided another sprocket, not shown but well known in the art, rotated by a film winding mechanism.

When the movable body portion 9 has been extensibly moved, the free end 24c of the sliding lever 24 is engaged by the bent portion 31a of a V-shaped lock lever 31 which is mounted and movable up and down on a shaft 32. The rotation of the V-shaped lock lever 31 is restricted between pins 33 and 34. Usually, the lock lever 31 is urged upwardly and counterclockwise, in FIG. 4, by a spring 35. Between the pin 34 and the movable body portion 9 there is stretched a tension spring 36 so as to pull back the extensibly moved body portion 9.

The film loading door 39 which is hinged at 40 fits into the recessed portion 21 of the bottom of the camera body 1 upon closed.

Figure 6:
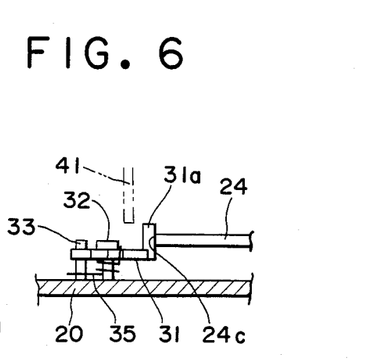
FIG. 6 is a partial side view of a latch mechanism comprising a sliding and lock levers.

In FIG. 6 showing the sliding lever engaged by the lock lever, the movable body portion 9 is extensibly moved, bringing the sliding lever 24 to the engagement with the bent portion 31a of the lock lever 31. The sliding lever 24 is caused to disengage as a result of closing the film loading door 39, i.e., by a hook member 41 provided on the film loading door 39 pushing down the lock lever 31. On the disengagement, the bent portion 31a of the lock lever 31 enters into the under side of the sliding lever 24 since which is slidably moved to the left by the tension spring 36. As a result of the sliding movement of the sliding lever 24 to the left, there is caused the engagement of the hook member 41 by the sliding lever 24 so as to restrict the film loading door 39 to open until the movable body portion 9 is extensibly moved from the camera body 1 for film loading. On the other hand, the sliding lever 24, at the end of sliding movement to the left, causes a switch 43 to turn on.

Figure 5:
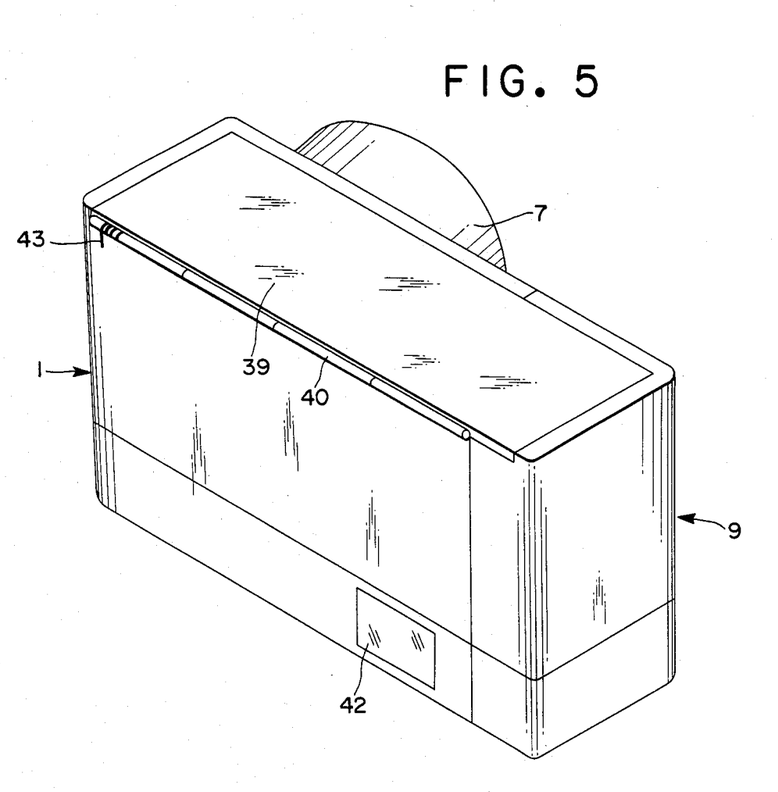
FIG. 5 is a perspective view of the camera, showing the film loading door closed to shielding the camera body.
Figure 7:
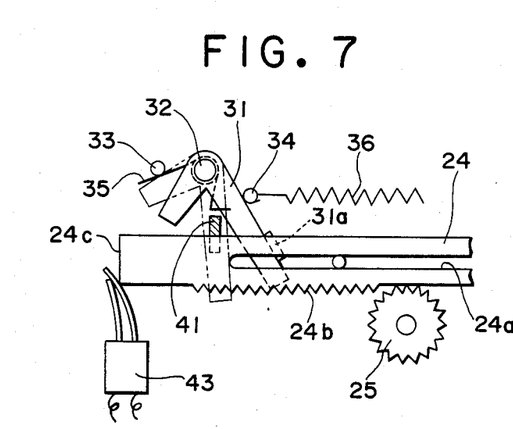
FIG. 7 is a partial plane view of the latch mechanism when the camera body is in its incorporated position.

Now the cooperation of the movable body portion and the film loading door will be explained. When the film loading 39 has been closed as shown in FIG. 5, the film loading door 39 is restricted to open because of the fact that the hook member 31 is engaged by the sliding lever 24 as seen in FIG. 7. The movement of the movable body portion 9 to the right, in FIG. 5, against the spring 36 for the aim of inserting the film container 12 into the film supply chamber 11 follows the sliding movement of the sliding lever 24 to the same direction, permitting the hook member 41 to disengage from the sliding lever 24 so as to allow the film loading door 39 to partialy open under the influence of the force of a spring 44 mounted on the hinge 40.

Further movement of the sliding lever 24 to the right causes the lock lever 31 to disengage from the sliding lever 24 and to thereby move upwardly. When removing the force having been applied to the movable body portion 9 for extensibly moving the same, the movable body portion 9 and hence the sliding lever 24 will slightly return to the left, resulting in the abutment against the bent portion 31a of the lock lever 31 accompanied with the clockwise rotation of the lock lever 31 against the spring 35 until restricted by the pin 33. In such a way, the return movement of the sliding lever 24 and hence the movable body portion 9 is prevented.

The film loading door 39, which has been partially opened, is then fully opened so as to expose the film supply chamber 11 and the film passage way 3 for film loading and unloading. The film container 12 is then dropped in or inserted into the film supply chamber 11 with insertion of the film leader previously drwan out of the film container 12 into the film passage way 3.

Closing the film loading door 39 after the insertion of the film container 12 into the film supply chamber 11 causes the hook member 41 to push down the lock lever 31 so as to disengage the end 24a of the sliding lever 24. When the disengagement is occured, the sliding lever 24 and hence the movable body portion 9 is allowed to move to the left under the influence of the tension spring 36.

The sliding lever 24, when moving to the left, forces the sprocket drum 28 coupled, via the shaft 27, gear 26 and the pinion 25, to the rack 24b to rotate. The rotation imparted to the sprocket drum 28 by the sliding lever 24 enables one or two teeth 28 provided around the sprocket drum 28 to positively engage with perforation or perforations of the film leader of the film 4 and then advance the film toward the film take-up chamber 5. In the early stage of film advancement, the previously drawn film leader, which is normally curled, tends to coil around the film take-up spool 6 mounted in the take-up chamber 5. At this time, since the sliding lever 24 turns the switch 43 on, a motor is actuated to rotate the film take-up spool 6 as will be described later. The rotation imparted to the film take-up spool 6 by the motor causes the teeth 6a of the film take-up spool 6 to capture the film leader through its perforations 4a so as to secure the same to the take-up spool 6, accomplishing automatic film loading. According to the camera thus constructed, even a film container having a film leader insufficiently drawn out thereof can be automatically loaded because of the fact the leader can be forced to be further drawn out of the container 12 enough to reach the film take-up spool 6.

At the limit of the movement of the sliding lever 24 to the left, the rack 24b comes off the pinion 25, permitting free rotation of the pinion 25 and ensuing rotation of the sprocket drum 28. It should be noted that a friction clutch mechanism well known in the art may be provided between the gear 26 and sprocket drum 28 in order to leave the rack and pinion 24b, 25 threadingly engaged. Regarding the film loading door 39, it is automatically latched by bringing the sliding lever 24 into engagement with the hook member 41 so as not to open due to careless operation.

Figure 10:
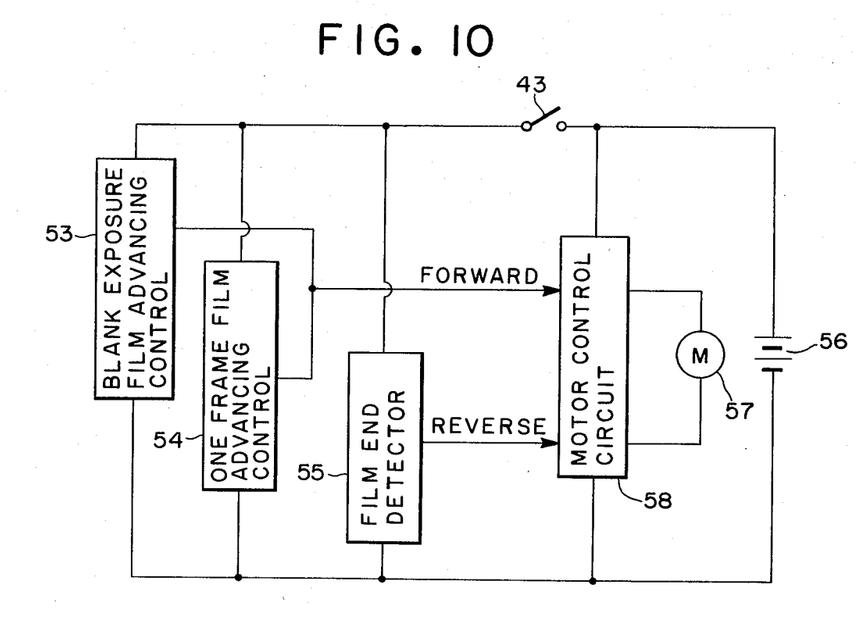
FIG. 10 is a block diagram showing an example of motor control circuit.

When the movable body portion 9 is moved to the left to incorporated with the camera body 1, the sliding lever 24 at its free end 24c pushes the switch 43 to turn the same on, actuating the motor shown in FIG. 10 to rotate, resulting in rotation of the film take-up spool 6 which causes the film 4 to be advanced to the first frame by blanking at least two exposures.

Figure 8:
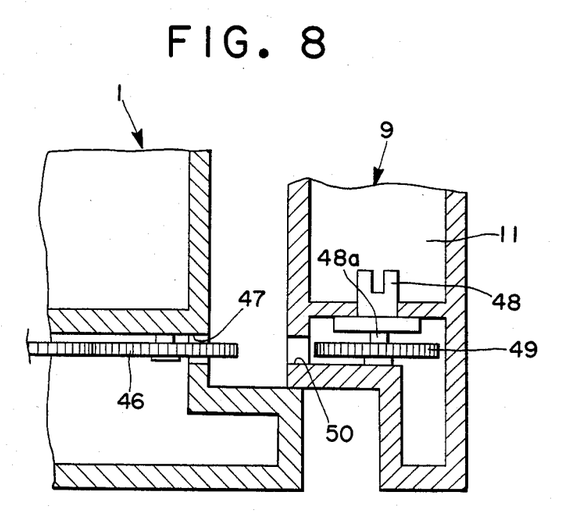
FIG. 8 is a cross sectional view showing a film rewind mechanism of the camera shown upside down.
Figure 9:
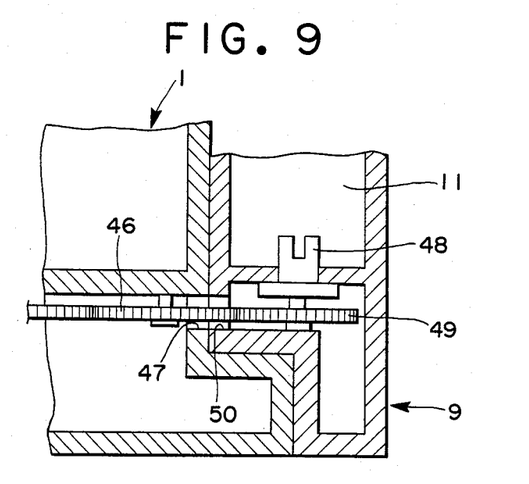
FIG. 9 cross sectional view similar to FIG. 8 when the camera body is in its incorporated position.

Referring now to FIGS. 8 and 9, there is shown a film rewinding mechanism. As is well known in the art, a motor is accommodated inside the film take-up spool 6. The rotation is imparted, via gears, to a gear 46 which partially protrudes out of the camera body 1 through an opening 47 thereof. Inside the movable body portion 9 there are provided a rewind spindle 48 projecting into the film supply chamber 11 and gear 49 which is mounted on a shaft 48a of the rewind spindle 48. As seen from FIG. 9, the gear 46 partially protruding out of the camera body 1 enters into the inside of the movable camera body 1 through an opening 50 thereof and engages with the gear 49 when the movable body portion 9 is incorporated with the camera body 1. Upon rewinding film, the rotation imparted to the rewind spindle 48 by the motor causes a spool 12a of the film container 12 to rotate so as to rewind the film into the film container 12.

FIG. 10 shows a motor control circuit. The switch 43 operates, when turned on, to permit the supply of electric power to a blank exposure film advancing control 53, one frame film advancing control 54, and film end detector 55 from a battery 56. The blank exposure film advancing control 53 is adapted to continuously advance film to the first frame by blanking first two or three exposures in cooperation with a film counter mechanism well known in the art when the switch 43 is turned on for the first time. The one frame film advancing control 54 is actuated to allow the advancement of film immediately after releasing shutter and turns to restrict the advancement of film when one frame of film is advanced by full one revolution of the sprocket 28. The film end detector 55 which mainly comprises a timer circuit can provide a reverse signal which in turn is applied to and actuates the motor control circuit 58 so as to reverse the motor for film rewinding. The provision of reverse signal is occurred when the film end detector 55 has detected that the time during which the motor is left energized is longer than that required to advance the film by one frame, which is assumed that the last exposure has been made. On the other hand, the motor control circuit 58 receives a forward signal from either one of film advancing control 53 and 54 to allow the motor 57 to rotate in the forward direction by, for example, energizing a relay included therein so as to advance the film 4 to the film take-up chamber 5.

While the invention has been shown and described with reference to a few specific embodiments thereof, it should be clearly understood that those skilled in the art will make changes without departing spirit and scope of the invention as defined in the appended claims concluding the specification.

What is claimed is:

1. A camera having a film supply chamber into which a film container with a drawn film leader is inserted axially, a film take-up chamber including a film take-up spool around which the film drawn out of the film container is wound and a film passage way connecting between the film supply and film take-up chambers into which the drawn leader is inserted upon inserting the film container into the film supply chamber; said camera comprising;

a camera body having either one of said chambers and a part of said film passage way;

a movable member having the other of said chambers and the remaining part of said film passage way, said movable member being mounted on said camera body so that said movable member is extensibly moved from a position where incorporated with said camera body to a position where allowing insertion of a film container thereinto in order to substantially elongate said film passage way; and a film loading door for closing and shielding said film supply chamber and film passage way.

2. A camera as defined in claim 1 further comprising spring means for pulling said movable member to said incorporated position.

3. A camera as defined in claim 2 further comprising means for keeping said movable member in said extensibly moved position and allowing, in cooperation with closing of said film loading door, said movable member to its incorporated position.

4. A camera as defined in claim 3 further comprising a sprocket engageable with perforations of said drawn film leader for the advancement thereof toward said film take-up chamber and means for causing said sprocket to rotate in cooperation with the movement of said movable member from said extensibly moved position to said incorporated position.

5. A camera as defined in claim 5 further comprising a motor for causing rotation of said sprocket and a switch adapted to turn on when said movable member is in said incorporated position for allowing power supply to said motor.

6. A camera as defined in claim 5 further comprising a gear train extending between said camera body and movable member, at least one of said gear train being provided in said movable member.

7. A camera as defined in claim 6 in which said film loading door is pivotably mounted at the bottom of said camera body.

8. A camera as defined in claim 7 in which said movable member includes a film supply chamber and said camera body includes a film take-up chamber.

9. A camera as defined in claim 2 further comprising a sliding lever of which one end is fixedly attached to said movable member, a lock lever for engaging said sliding lever so as to keep said movable member in said extensibly moved position, a hook member mounted on the inside of said film loading door for pushing said lock lever down to disengage said sliding lever from said lock lever when the film loading door is closed and engaging with the end portion of said sliding lever when said movable member is returned to said incorporated position so as to prevent said film loading door from opening.

10. A camera as defined in claim 9 further comprising a sprocket engageable with perforations of said drawn leader for the advancement thereof toward said film take-up chamber and means for causing said sprocket to rotate in cooperation with the movement of said movable member from said extensibly moved position to said incorporated position.

11. A camera as defined in claim 10 in which said means comprises a rack and pinion mechanism for providing the rotation imparted to said sprocket by said movable member, said rack being formed on one side of said sliding lever.

12. A camera as defined in claim 11 further comprising a motor for causing rotation of said sprocket and a switch adapted to turn on when said movable member is in said incorporated position for allowing said motor to be energized.

13. A camera as defined in claim 12 in which said camera body includes a film take-up chamber and said movable member includes a film supply chamber.

* * * * *